United States Patent
Graupner et al.

(10) Patent No.: US 8,385,037 B2
(45) Date of Patent: Feb. 26, 2013

(54) PROTECTIVE SWITCHING DEVICE FOR MONITORING THE ELECTRICAL CURRENT FLOW TO AN ELECTRICAL USER AND METHOD FOR MONITORING THE ELECTRICAL CURRENT FLOW TO AN ELECTRICAL USER BY WAY OF A PROTECTIVE SWITCHING DEVICE

(75) Inventors: Dirk Graupner, Meerane (DE); Reinhard Schmid, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 253 days.

(21) Appl. No.: 12/919,147

(22) PCT Filed: Jan. 28, 2009

(86) PCT No.: PCT/EP2009/050909
§ 371 (c)(1),
(2), (4) Date: Aug. 24, 2010

(87) PCT Pub. No.: WO2009/109424
PCT Pub. Date: Sep. 11, 2009

(65) Prior Publication Data
US 2011/0026181 A1    Feb. 3, 2011

(30) Foreign Application Priority Data
Mar. 5, 2008 (DE) .......................... 10 2008 012 605

(51) Int. Cl.
*H02H 3/08* (2006.01)
(52) U.S. Cl. ...................................... 361/93.9; 361/93.7
(58) Field of Classification Search .................... 361/18, 361/93.7–93.9
See application file for complete search history.

(56) References Cited

U.S. PATENT DOCUMENTS

| | | | | |
|---|---|---|---|---|
| 4,858,057 A | * | 8/1989 | Maier et al. ..................... | 361/94 |
| 4,943,888 A | | 7/1990 | Forman | |
| 5,216,352 A | | 6/1993 | Studtmann et al. | |
| 5,844,493 A | * | 12/1998 | Pohl et al. ..................... | 340/657 |
| 6,167,329 A | | 12/2000 | Engel et al. | |
| 6,175,780 B1 | | 1/2001 | Engel | |
| 6,292,717 B1 | | 9/2001 | Alexander | |
| 2003/0137309 A1 | | 7/2003 | Itimura | |
| 2004/0145844 A1 | * | 7/2004 | Franke et al. ................. | 361/93.1 |

FOREIGN PATENT DOCUMENTS

| | | |
|---|---|---|
| EP | 0949733 A2 | 10/1999 |
| EP | 0949734 A2 | 10/1999 |
| JP | 2003009374 A | 1/2003 |
| WO | WO 9209943 A1 | 6/1992 |

OTHER PUBLICATIONS

International Search Report, Oct. 2005.

* cited by examiner

*Primary Examiner* — Danny Nguyen
(74) *Attorney, Agent, or Firm* — Harness, Dickey & Pierce, P.L.C.

(57) ABSTRACT

A protective switching device is disclosed for monitoring the electrical current flow to an electrical user, including a switching functionality, an excess current triggering functionality and a short circuit triggering functionality. In at least one embodiment, the protective switching device includes a first microcontroller with a first input signal filter, wherein the first microcontroller is configured for monitoring the excess current triggering functionality and wherein a second microcontroller is provided with a second input signal filter that is configured for monitoring the short circuit triggering functionality, wherein the two input signal filters are designed differently, and wherein the switching functionality is provided in one of the two microcontrollers. A method is further disclosed for monitoring the electrical current flow to an electrical user by way of a protective switching device.

20 Claims, 2 Drawing Sheets

PROTECTIVE SWITCHING DEVICE FOR MONITORING THE ELECTRICAL CURRENT FLOW TO AN ELECTRICAL USER AND METHOD FOR MONITORING THE ELECTRICAL CURRENT FLOW TO AN ELECTRICAL USER BY WAY OF A PROTECTIVE SWITCHING DEVICE

PRIORITY STATEMENT

This application is the national phase under 35 U.S.C. §371 of PCT International Application No. PCT/EP2009/050909 which has an International filing date of Jan. 28, 2009, which designates the United States of America, and which claims priority on German patent application number DE 10 2008 012 605.5 filed Mar. 5, 2008, the entire contents of each of which are hereby incorporated herein by reference.

FIELD

At least one embodiment of the present invention generally relates to a protective switching device for monitoring the electrical current flow to an electrical load, comprising a switching functionality, an excess current triggering functionality and a short circuit triggering functionality, comprising a first microcontroller with a first input signal filter. At least one embodiment of the invention also generally relates to a method for monitoring the electrical current flow to an electrical load by way of a protective switching device.

BACKGROUND

Protective switching devices for monitoring the electrical current flow to an electrical load are, for example, multifunctional low-voltage switching devices within the meaning of standard EN 60947-6-2 and power switches with electronic excess current protection within the meaning of standard EN 60947-2. These are coordinated with what is referred to as a setting current ($I_E$). This should match the rated current ($I_N$) of the electrical load. If the current that is actually flowing exceeds the setting current a trigger signal is transmitted according to duration and flowed current. The protective switching devices either disconnect the downstream load from the supply on the occurrence of such an overload or forward the occurrence to a high-order unit. The limit values of the signal are usually detected via a trigger characteristic curve, see FIG. 1.

Figure 1:
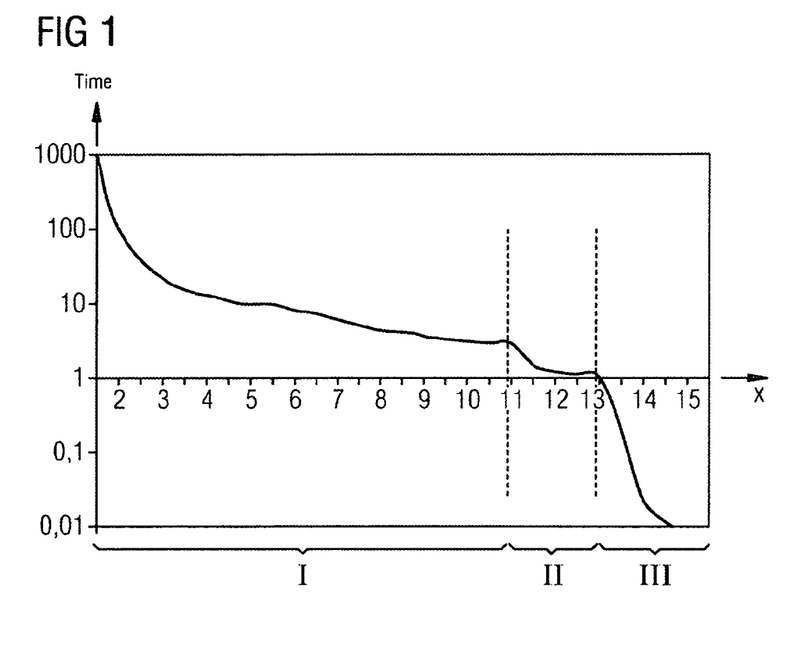
FIG. 1 shows a typical trigger characteristic curve for determining the limit values of the input signal.

Three different scenarios will be considered in this case. If the current that is actually flowing exceeds the setting current ($I_E$) by a relatively small amount, then, depending on the specific values thereof, the current is allowed to continue to flow for a while. A first region I of the characteristic curve according to FIG. 1 is used as a limit value for triggering. A protective device of this type may also be taken to mean an excess current protective device and is normatively identified as a "dependently delayed excess current trigger" to standards EN 60947-6-2 (section 5.7.1.3.2) and EN 60947-1 (section 2.4.24). This dependently delayed excess current triggering is generally used to protect users of electrical power from thermal damage.

If the current exceeds the setting current ($I_E$) by a lot the load must be disconnected from the mains as quickly as possible. A second region II of the characteristic curve according to FIG. 1 is used as a limit value for triggering. The protective device then operates as short circuit protection and is normatively identified as an "undelayed short circuit trigger" to standards EN 60947-6-2 (section 5.7.1.3.1) and EN 60947-1 (section 2.4.26).

Owing to the need for self-protection a third region II may be defined in the transition region between short circuit protection and excess current protection in electronic protective devices, see FIG. 1. This can either be taken to mean an "independently delayed short circuit trigger" to standard EN 60947-6-2 (section 5.7.1.3.2) or an "independently delayed overload trigger" to standards EN 60947-1 (section 2.4.26) and EN 60947-1 (section 2.4.24).

Numerous advantages result if microcontrollers are used in novel electronic devices. Therefore various types of device within a connected family may be implemented using firmware variants without the hardware-side vertical range of manufacture becoming too great. With the aid of the controller it is possible to inexpensively integrate numerous special functions, the protective switching devices can be constructed so as to be adjusted more effectively and to react more accurately to the measured parameters. Furthermore, a gradual improvement in the protective switching devices is often possible without cost-intensive changes in hardware, such as what is known as a relayout, changes to tools, or the like.

However, with such protective switching devices there is the problem of an undelayed short circuit trigger and a dependently delayed excess current trigger making demands of a quite different nature.

The dependently delayed excess current trigger, also called an overload trigger, must therefore be capable of processing a corresponding $I^2t$ trigger limit according to the characteristic curve in FIG. 1. After the overload trigger has been triggered it may be activated after expiration of the restoration readiness period. The consequence of all this is that the overload trigger has to detect and evaluate current-time dependencies and periods. Brief cutoffs in the meantime must also take account of the thermal pre-stresses of the load. An advantage of this function is that the relatively large amount of time available can be seen, i.e. overload triggering is not time-critical.

As a rule the short circuit trigger does not have to detect current-time dependencies and periods. Short circuits with very low residual impedances, what are known as hard short circuits, must be detected and evaluated as quickly as possible, however. The load must be disconnected from the mains as quickly as possible in this case in order, as far as possible, to avoid consequential damages and to protect the trigger itself, what is known as self-protection. Normatively the respective rated breaking capacity of the protective switching devices is referred to which the, in part briefly very high, energy densities must withstand. The arc that is produced in the process is consumed in the arcing chambers.

This contrast between short circuit triggering and overload triggering results in quite different demands, so processing in joint groups will always be linked with compromises. A signal input filter therefore has to satisfy both demands. The resolutions required of an analog-digital converter that is used are high as an additional measuring range of the current has to be covered.

Conventional excess current protective devices contain a bimetal through which the current of the load flows. This current heats the bimetal as a function of the current intensity and duration:

$$\delta Q = I^2 R^* t$$

Alternatively the bimetal can also be heated by indirect heating from adjacent conductors. The different coefficients of thermal expansion of the materials in the bimetal bend the bimetal and provide a message for further processing or trigger a corresponding occurrence.

A trigger that works magnetically is used in conventional devices for the fast short circuit detection mentioned above. If the current increases then the magnetic field in a coil designed for this purpose increases. Owing to the electromagnetic forces this leads, above a certain limit value, to a movement of an armature or needle in the core of the coil. This armature conventionally triggers at a switch latch in the case of a short circuit occurrence and then causes the switch latch to unlatch or be released. In general it may therefore be said that different electromechanical components are used in conventional devices, even if both functions—overload and short circuit triggering—are present. This solution is space-intensive and expensive.

Novel devices work electronically with the aid of a microcontroller. In this case the signal characteristics of the currents of the load or the voltage characteristics are digitally sampled. This time-quantized signal is stored in discrete values. An analog-digital conversion takes place here. It is therefore possible to depict the signal characteristics more accurately and to store various characteristic curves or characteristics in the devices. Different execution algorithms result from the different demands of short circuit triggering and overload triggering. The demands on the corresponding microprocessor are correspondingly high. Mixed forms are also conceivable in which one function is conventionally implemented and the other one is electronically implemented.

SUMMARY

At least one embodiment of the of the present invention creates a protective switching device and/or a method for electronic function splitting in instances of overload and short circuit in a protective switching device, which operates simply and quickly and is inexpensive to achieve. The switching protective device and/or the method, in at least one embodiment, should reduce the loading on the microcontrollers that are used. Short circuit detection should, moreover, be configured for safe and fast triggering.

At least one embodiment of the invention is directed to a protective switching device and/or a method. Further features and details of the invention emerge from the subclaims, the description and the drawings. Features and details that are described in connection with the protective switching device obviously also apply in connection with the method and vice versa, respectively.

According to a first aspect of least one embodiment of the invention, a protective switching device is disclosed for monitoring the electrical current flow to an electrical load, comprising a switching functionality, an excess current triggering functionality and a short circuit triggering functionality, comprising a first microcontroller with a first input signal filter, the first microcontroller being configured for monitoring the excess current triggering functionality, and a second microcontroller being provided with a second input signal filter that is configured for monitoring the short circuit triggering functionality, the two input signal filters being designed differently, and in which the switching functionality being provided in one of the two microcontrollers.

In at least one embodiment, the protective switching device comprises two simple microcontrollers, in particular having multiply graduated short circuit detection, instead of one more complex microcontroller. As a result the protective switching device can cater to the different demands of short circuit triggering and overload triggering more effectively and more purposefully. In other words, one microcontroller is responsible for short circuit triggering and one microcontroller for overload triggering.

The two microcontrollers can each be configured so as to be small, inexpensive and fast. Using two inexpensive, fast and small microcontrollers does not necessarily result in a financial drawback compared with one larger microcontroller. The price of a microcontroller is primarily determined by the program memory required, as a rule a flash memory, and by the size of the housing. The required program memory is accordingly split in the solution with two microcontrollers.

The same applies to the input signal filter. With the protective switching devices known from the prior art, which comprise one microcontroller and one input signal filter, which is responsible for both overload detection and short circuit detection, the complex microcontroller works slowly because it has to check both scenarios—short circuit and overload. This takes time. Short circuit detection that is as fast as possible requires input signal filters whose low-pass character is not too strong in order to dampen rising steep edges as little as possible. However, it is important to avoid sampling errors in the case of overload triggering. It is necessary to detect decreasing and increasing values for this purpose. Fast transients and harmonic components can be filtered more effectively owing to the less time-critical circumstances in the case of overload detection, i.e. input signal filters with low-pass character or higher-order input signal filters are required.

A separate, specific input signal filter can be associated with each microcontroller as the protective switching device comprises two microcontrollers. This does not have to constitute a financial drawback either as the two individual, specific input signal filters can in themselves be more simply designed than a single complex input signal filter which has to cover both overload detection and short circuit detection.

The first microcontroller with the first input signal filter is used to monitor the excess current load. The second microcontroller with the second input signal filter is used to monitor a short circuit. The second input signal filter of the second microcontroller is preferably configured for optimally fast short circuit detection, i.e. the low-pass character of the second input signal filter is weak in order to dampen rising steep edges as little as possible. The first input signal filter of the first microcontroller is preferably configured for overload detection. In other words, the first input signal filter can dampen interferences and filter out fast transients and harmonic components more effectively. The low-pass character of the first input signal filter of the first microcontroller is therefore preferably much higher than the low-pass character of the second input filter of the second microcontroller.

The two microcontrollers, and accordingly the two input signal filters, work completely independently of each other.

The switching functionality for operational switching of the protective switching device can optionally be integrated in one of the two microcontrollers. The switching functionality for operational switching of the protective switching device is preferably integrated in the first microcontroller, however, which is responsible for excess current triggering. In other words, the first microcontroller advantageously comprises the switching functionality and the excess current triggering functionality.

In at least one embodiment is a protective switching device in which the second microcontroller comprises a comparator and at least two measuring devices arranged one after the other downstream of the comparator, and comparison units for measuring the current intensity or the voltage and for comparing the measured current intensity or voltage with reference current intensities or reference voltages, and a triggering signal unit connected downstream of the measuring devices. With a protective switching device of this kind short circuit triggering is designed so as to be nested for safer and faster triggering. The measuring devices each comprise a measuring algorithm by means of which the voltages that have occurred can be measured.

In the case of a short circuit the comparator samples the values of the input signal, i.e. the accrued current intensity or the accrued voltage, very quickly, i.e. the comparator works very quickly. As a result the electrical connection from a supply to a load can be disconnected very quickly when a short circuit occurs.

The comparator compares the input signal, in particular the voltage, with a reference voltage. The comparator reacts differently depending on whether the voltage is greater or smaller than the reference voltage. If the comparator finds that the input voltage lies above a certain input voltage it triggers a signal which leads to what is known as a comparator interrupt on the software-side, so an interruption routine is entered into. Measuring devices or measuring algorithms present in the microcontroller can be used therein to re-measure the voltage that has occurred.

A short circuit algorithm is advantageously triggered by the comparator interrupt on the software side since the comparator reacts very quickly. The comparator interrupt is ideally triggered above 13 times the value of the rated current ($I_N$). The value above which the comparator interrupt is triggered can also be individually set in the protective switching device, however. The short circuit algorithm accordingly points to the corresponding phase and a first measuring device or a first measuring algorithm re-measures the current.

If the first measuring device finds that the determined current intensity lies above a first reference current intensity, which is set relatively high, the first measuring device or the first measuring algorithm transmits a signal to generate a trigger signal. The first measuring device operates relatively quickly in order to determine whether the current intensity that has occurred has exceeded a high value, i.e. the first reference current intensity. Especially fast measurements are advantageously possible in the case of inaccurate measurements. By way of example, the first measuring device present in the controller can be overclocked. The first reference current intensity is, for example, 52 times the value of the rated current intensity. If the first measuring device or the first measuring algorithm finds that the current intensity that has occurred has not exceeded the value of the first reference current intensity, the first measuring device or first measuring algorithm sends a signal to the second measuring device, so the second measuring device or second measuring algorithm re-measures the current intensity again and compares it with a second reference current intensity that is lower than the first reference current intensity.

If the second measuring device or second measuring algorithm finds that the measured current intensity exceeds the second reference current intensity, the second measuring device or second measuring algorithm transmits a signal to generate a trigger signal. If the second measuring device or second measuring algorithm finds that the measured current intensity does not exceed the second reference current intensity, the second measuring device does not transmit a signal and in particular does not transmit a trigger signal.

The purpose of the nested measuring devices or nested measuring algorithms and the comparator intervention when determining the current intensities is that a signal to trigger or disconnect the electrical connection is generated very quickly when a very high current, i.e. a short circuit current, occurs.

The first measuring device or the first measuring algorithm checks the current intensity that has occurred very quickly but also somewhat crudely. However, if the first measuring device or first measuring algorithm establishes that the determined current is very high, i.e. lies above the first reference current intensity, the first measuring device triggers the trigger signal directly because the current flow should be interrupted as quickly as possible.

If the current intensity lies below the first high reference current intensity, the current intensity is re-measured again more accurately by the second measuring device or second measuring algorithm. There is also more time available for measuring owing to the lower current in the case of measurement in the second measuring device. The second measuring device measures more slowly and therefore more accurately. This nested measurement can ensure that the second microcontroller is only triggered if this is actually necessary. A protective switching device of this type only disconnects the electrical connection if a current that lies above a second reference current intensity has actually occurred. The second measuring device or the second measuring algorithm therefore preferably has a higher resolution than the preceding first measuring device or preceding first measuring algorithm. If the current intensity that has occurred lies below the second reference current intensity it is possible to return to the original state.

The second microcontroller checks very quickly whether a short circuit exists. Nested measurement means that the second microcontroller can determine very quickly and accurately whether a short circuit exists. As the measurement is not as time-critical on the occurrence of an overload as it is in the case of a short circuit, the first microcontroller can accurately check to what extent an overload existed.

Re-measuring of the current intensity by the second measuring device or second measuring algorithm increases the signal-to-noise ratio and ensures the availability of the protected system. The protected system or the protected load is safely disconnected from the mains by the separate short-circuit measurement if a very high current occurs. At the same time, however, the second microcontroller means that it is possible for the system/load to not be switched off unnecessarily if it is found that the current intensity that has occurred or the voltage measurement at the measuring devices only came about due to interference or couplings.

A protective switching device is disclosed in at least one embodiment in which the first and second measuring devices each comprise an analog-digital converter. The analog-digital conversion is most time-consuming in the microcontroller, however. In other words, an analog-digital converter in a microcontroller as a rule works using the method of successive approximation and is relatively slow. If the resolution is dispensed with it is possible to operate the analog-digital converter, in this case the first measuring device, quickly, to overclock as it were. As very high currents, i.e. very hard short circuits, supply values which exceed the trigger threshold, i.e. the first reference current intensity, by a lot, a high resolution may also be dispensed with in this case in favor of the shorter measuring time that is therefore possible. If the measured values lie below a certain threshold, i.e. the first reference current intensity, there is a less hard short circuit, so the second measuring device has to carry out another, more accurate measurement. There is also slightly more time available in this case, however.

Auxiliary measurements in certain fixed time slots are conceivable for detecting the exact current intensities that have occurred. Very hard short circuits lead to current characteristics which allow the delta, i.e. the difference between two measurements of identical time intervals, to become bigger than the typical signal characteristic would allow during normal operating performance.

The resolution of the first measuring device or first measuring algorithm is lower than the resolution of the second measuring device or second measuring algorithm. The resolutions can have the most diverse values in this connection. By way of example, a protective switching device is preferred in which, in the case of analog-digital conversion, a 6 to 8 bit resolution is used with the first measuring algorithm and a 9 to 10 bit resolution with the second measuring algorithm. The lower the required resolution of the analog-digital conversion, the more inaccurately it measures the current intensity. The accuracy of the analog-digital converter therefore depends on the number of clock cycles, what is referred to as the bit resolution. An analog-digital conversion in which an 8 bit resolution is used is faster than an analog-digital conversion in which a 10 bit resolution is used.

Furthermore, a protective switching device is disclosed in at least one embodiment in which the low-pass character of the first input signal filter of the first microcontroller is higher than the low-pass characters of the second input signal filter of the second microcontroller. This allows the second microcontroller to measure the current quickly if a high current, i.e. a short circuit, occurs, while the first microcontroller can slowly and reliably measure an overload that has possibly occurred.

The protective switching device can, for example, be a multi-functional low-voltage switching device or a power switch with electronic excess current protection. Multi-functional low-voltage switching devices within the meaning of standard EN 60947-6-2 and power switches with electronic excess current protection within the meaning of standard EN 60947-2 in particular are particularly preferably designed in this way. Protective switching devices of this kind protect a downstream system or a downstream load particularly reliably.

According to a second aspect of at least one embodiment of the invention, a method is disclosed for monitoring the electrical current flow to an electrical load by way of a protective switching device, wherein a first input signal filter of a first microcontroller monitors the signal characteristic of the current flow or the voltage and the first microcontroller generates an error signal and/or a trigger signal when an overload is detected, and wherein a second input signal filter of a second microcontroller monitors the signal characteristics of the current flow or the voltage, and the second microcontroller generates a trigger signal when a short circuit is detected, wherein the two input signal filters are designed differently and wherein the current flow is interrupted following generation of a trigger signal.

A method of at least one embodiment for monitoring the electrical current flow to an electrical load by a protective switching device allows electronic function splitting into overload occurrences and short circuit occurrences. The loading on the microcontrollers used is reduced by the protective switching device and the method.

The second microcontroller is responsible for short circuit triggering and the first microcontroller for overload triggering. The second microcontroller can very quickly determine whether a short circuit exists. The second microcontroller is specifically designed for this purpose. In other words, the input signal filter of the second microcontroller can react very quickly to high current intensities. The first input signal filter of the first microcontroller can determine instances of overload better.

In at least one embodiment is a method in which the second microcontroller uses a comparator, the comparator monitoring the signal characteristic of the current flow or the voltage characteristic, and wherein a first measuring device, connected downstream of the comparator, re-measures the current intensity when an input current intensity or input voltage is exceeded, and a first comparison unit compares this with a first reference current intensity, and wherein the first measuring device transmits a signal to generate a trigger signal when it is detected that the measured current intensity exceeds the first reference current intensity, or the first measuring device activates a second measuring device connected downstream when it is detected that the measuring current intensity does not exceed the first reference current intensity, so the second measuring device re-measures the current intensity again and a second comparison unit compares it with a second reference current intensity, the second measuring device providing a signal to generate a trigger signal when it is detected that the measured current intensity exceeds the second reference current intensity, or the second measuring device does not provide a signal to generate a trigger signal when it is detected that the measured current intensity does not exceed the second reference current intensity.

The comparator very quickly establishes that there is a high current intensity. For this purpose the comparator continuously compares the value of the input signal. The comparator responds very quickly if a high current intensity exists. The comparator compares the input signal, in particular the voltage, with a reference voltage. If the comparator establishes that the input voltage lies above a certain voltage level it triggers an algorithm interruption, what is referred to as the comparator interrupt. The subordinate first measuring device or subordinate first measuring algorithm then re-measures the voltage that has occurred. The comparator interrupt triggers above 13 times the value of the rated current ($I_N$) in this case, for example. The algorithm now points to the corresponding phase of the three-phase current, for example in a three-phase mains, and the first measuring algorithm re-measures the current. The basic algorithm has a loop which allows the direct-current fractions of all phases—with a three-phase mains this is three phases—to be sampled one after the other by the comparator and therefore short circuit detection. This allows joint evaluation.

If the first measuring device or first measuring algorithm finds that the determined current intensity lies above a first reference current intensity, the first measuring device or the first measuring algorithm transmits a signal to generate a trigger signal. The first measuring device or first measuring algorithm works relatively quickly to determine whether the current intensity that has occurred has exceeded the first high reference current intensity. In the process the first measuring device uses a lower resolution than the analog-digital converter in the microcontroller allows. If the first measuring device or the first measuring algorithm finds that the current intensity that has occurred has not exceeded the value of the first reference current intensity the second measuring device or second measuring algorithm is activated.

The second measuring device or second measuring algorithm re-measures the current intensity more accurately and compares this with a second reference current intensity which is much lower than the first reference current intensity. If the second measuring device or the second measuring algorithm finds that the measured current intensity exceeds the second reference current intensity a signal to generate a trigger signal is transmitted. If the first measuring device or second measuring algorithm finds that the measured current intensity does not exceed the second reference current intensity the second measuring device or second measuring algorithm does not forward a signal to generate a trigger signal. The check as to whether an overload existed is carried out by the first microcontroller.

With the nested measuring method the protective switching device can disconnect the electrical connection very quickly if it is found that a short circuit current exists. On the other hand, the method can determine with a low error rate how strong the fault current that has occurred really is. If no hard short circuit exists the second measuring device or the second measuring algorithm checks the exact strength of the fault current in order to not switch off the downstream system or load unnecessarily. This increases the availability of a system. If the second measuring device or second measuring algorithm establishes that the strength of the fault current lies between the first and second reference current intensities, i.e. that a less hard short circuit exists the second microcontroller also disconnects the current flow, however.

The second measuring device or second measuring algorithm has made sure that a short circuit, albeit a less hard short circuit, definitely existed. If more accurate measurement by the second measuring device establishes that no short circuit occurred, although the comparator detected more than $13 \times I_N$ owing to a coupling, the second microcontroller does not react at all but leaves potential reactions to fault currents to the first microcontroller which has accurate knowledge about the exact current intensities and their variations in time as well as the history of the values.

The first measuring device or the first measuring algorithm determines the current intensity that has occurred very quickly but also somewhat inaccurately. If a very high current intensity exists, for example above 52 times the value of the rated current intensity, the inaccurate measurement of the first measuring device or first measuring algorithm is sufficient, however, to decide that the current flow should be disconnected as quickly as possible. It is no longer necessary to check the current intensity more accurately in the case of very high values.

If the measured current intensity lies below the first reference current intensity, i.e. below 52 times the value of the rated current intensity for example, a more accurate measurement is made by the second measuring device or second measuring algorithm. The second measuring device or second measuring algorithm measures more slowly and therefore more accurately. If the second measuring device or second measuring algorithm finds that the fault current intensity lies below the second reference current intensity, the second microcontroller does not perform any further action but leaves this to the first microcontroller which simultaneously also monitors and checks the fault current that has occurred. As the two microcontrollers work independently of each other the first microcontroller disconnects the load from the mains when it determines that an excess current event has occurred. The current paths are stored in a memory in fixed time units, the memory being associated with the first microcontroller.

A method is disclosed in which the protective switching device for carrying out the method of at least one embodiment is configured in accordance with a protective device according to the first aspect of at least one embodiment of the invention. A protective device of this kind is particularly suitable for carrying out the method.

A method is also preferred in which a first measuring algorithm of the first measuring device measures at a lower resolution than a downstream second measuring algorithm of the second measuring device.

The first and second measuring algorithms preferably each use an analog-digital conversion. In particular the analog-digital conversion of the first measuring algorithm uses a 4 to 8 bit resolution and the analog-digital conversion of the second measuring algorithm a 9 or 10 bit resolution.

A method is also preferred in which at least one of the measuring algorithms uses the increase, i.e. what is known as a delta, in the current to reliably detect a short circuit occurrence.

The microcontrollers used are preferably freely programmable microcontrollers, preferably what are known as RISC.

BRIEF DESCRIPTION OF THE DRAWINGS

The invention will now be described in more detail with the aid of a non-exclusive example embodiment and with reference to the accompanying drawings, in which.

DETAILED DESCRIPTION OF THE EXAMPLE EMBODIMENTS

As already described in the introduction to the description, FIG. 1 shows, a typical trigger characteristic curve for determining the limit values of the input signal, i.e. the input voltage as a depiction of the operating current of a load. Using the trigger characteristic curve it may be decided whether a dependently delayed excess current, an independently delayed excess current or an undelayed short circuit current exists. The three different scenarios are shown in FIG. 1.

The protective switching device is coordinated with what is known as a setting current ($I_E$). This advantageously matches the rated current ($I_N$) of the protected electrical load. The current intensity is shown in the y axis and the time for triggering on the x axis. The current intensity increases in the case of an overload or a short circuit.

If the actually flowing current exceeds the setting current ($I_E$) or the rated current ($I_N$) a trigger signal is transmitted according to the duration and current that has flowed through one of the two microcontrollers of the protective switching circuit.

Determination of the limit values of the input signal is defined using the trigger characteristic curve, see FIG. 1. As already mentioned in the introduction to the description, the trigger characteristic curve is divided into three regions I, II, III. The first region I constitutes the "dependently delayed excess current region". In the first region I the actually flowing current lies between the value of the rated current intensity ($I_N$) and 11 times this. The current is allowed to continue to flow for a time in the case of such current intensities. With such current intensities the current flow is usually interrupted after a time if the corresponding $I^2t$ value is exceeded in order to protect the load against thermal damage.

The third region III constitutes the "undelayed short circuit region". If the current intensity that has occurred lies above an input current intensity, as a rule 13 times the value of the rated current intensity ($I_N$), the load must be disconnected from the mains as quickly as possible.

What is known as the transition region II is located between the undelayed short circuit region III and the dependently delayed excess current region I. In this exemplary embodiment a current intensity exists in the transition region II which lies between 11 times and 13 times the value of the rated current intensity ($I_N$).

Figure 2:
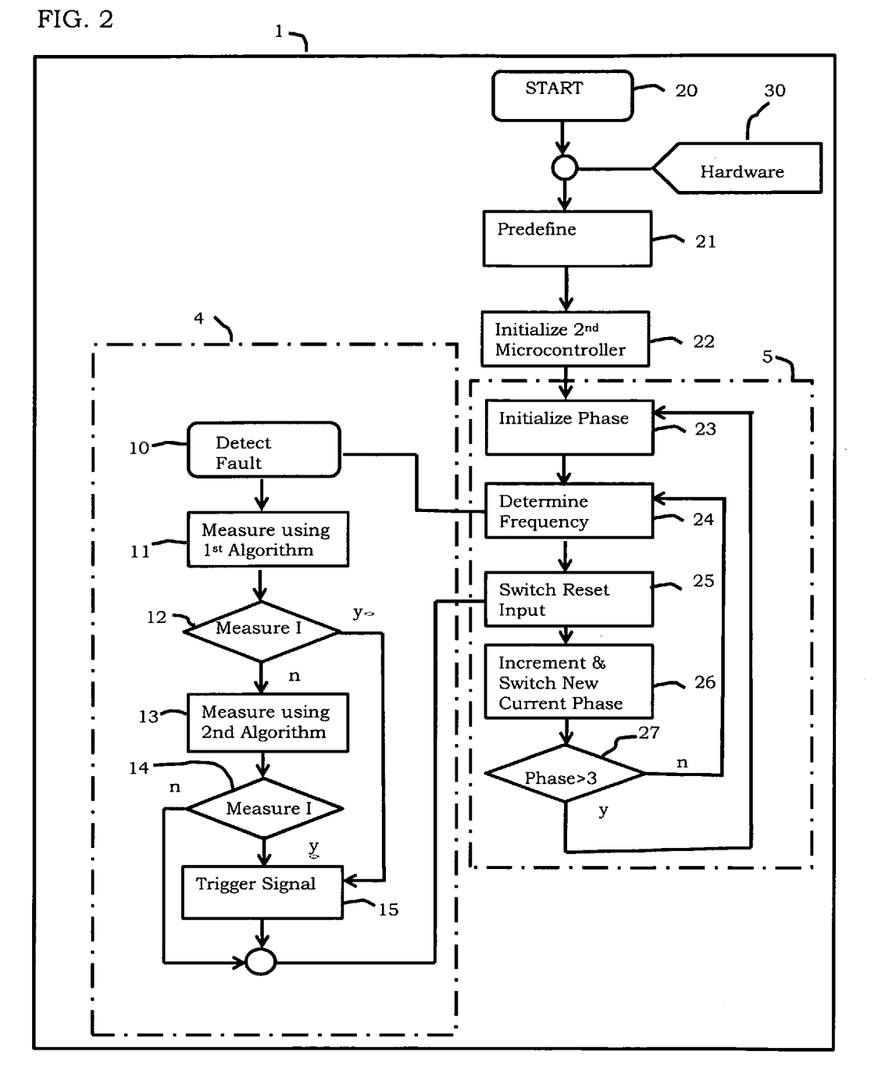
FIG. 2 shows a schematic diagram of an algorithm in a second microcontroller of a protective switching device with nested short circuit detection.

FIG. 2 schematically shows progression of short circuit detection in the second microcontroller 2 of a protective switching device 1 with nested short circuit detection 4. After the start 20 of the second microcontroller 2 certain required parameters are read from the hardware 30 of the second microcontroller 2 or protective switching device 1. After a pre-definition stage 21 (this can be omitted) the second microcontroller 2 is initialized in an initialization stage 22 and the phase in switching unit 23 set to 1. The different stages 23-27 are part of a loop 5 which ensures that all phases, for example all three phases of a grid, are checked one after the other.

Once the phase has been set to 1 the time frequency at which the current or voltage is sampled is determined in a time unit 24. The comparator 10 takes effect if it finds that a fault current or a fault voltage exists. In other words, the short circuit algorithm is advantageously triggered using software by a comparator interrupt above 13 times the value of the rated current limit since the comparator 10 is very quick. The short circuit algorithm now points to the corresponding phase, firstly phase 1, and measures the current through the first measuring device or the first measuring algorithm 11.

The signal-to-noise ratio is increased and the availability of the system is ensured owing to re-measurement by the second measuring device or second measuring algorithm 13. The analog-digital conversion in measuring devices 11, 13 is most time-consuming in the microcontroller 2. This works by using the method of successive approximation and is relatively time-consuming. If resolution is dispensed with it is possible to operate the analog-digital converter more quickly, i.e. to overclock. As very high currents, i.e. very hard short circuits, supply values which exceed the trigger threshold by a lot, resolution may also be dispensed with in this case in favor of the shorter measuring time that is therefore possible.

If the measured values lie below a certain threshold (less hard short circuit) then measurements must be taken again with a higher level of accuracy. In this case there is slightly more time available. In other words, the first measuring device or the first measuring algorithm 11 re-measures the current.

In a first comparison unit 12 it is checked whether the current that has occurred has a higher intensity than a first reference current intensity. The first reference current intensity is relatively high, for example it lies at 52 times the value of the rated current intensity. If the measured current intensity lies above the first reference current intensity this is forwarded directly to the trigger unit 15 which generates a trigger signal.

In an externally supplied system a phase is forwarded in the loop 5 so the current fractions of the next phase, in this case phase 2, are also checked by the short circuit detection 4. All phases of a power line can therefore be checked one after the other and a joint evaluation carried out. If the first comparison unit 12 finds that the current intensity, which the first measuring device or the first measuring algorithm 11 measured, lies below the first reference current intensity, the second measuring device or the second measuring algorithm 13 re-measures the current intensity again, more slowly but more accurately.

If the current intensity measured by the second measuring device or second measuring algorithm 13 lies above a second reference current intensity this is forwarded to the trigger unit 15 which generates a trigger signal. The second reference current intensity is lower than the first reference current intensity. The second reference current intensity advantageously lies at 13 times the value of the rated current intensity. If the second comparison unit 14 finds that the more accurately measured current intensity lies below the second reference current intensity the trigger unit 15 is by-passed so no trigger signal is triggered. The loop 5 ensures that all phases of a line are checked. If short circuit detection 4 finds that a current with an intensity that lies above the second reference current intensity in any phase, the second microcontroller 2 is not triggered.

In parallel with the second microcontroller 2 the protective switching device 1 comprises a first microcontroller 6 which is configured for checking an overload. As checking for the existence of an overload is not as time-critical as in the case of short circuit detection, a input filter 7 can be used in the first microcontroller 6 in the case of overload detection, which filter is different from the second input signal filter in the case of short circuit detection 4 by the second microcontroller 2, see FIG. 3.

In protective switching devices of this type the function for operational switching can be integrated in one of the microcontrollers, preferably in the first microcontroller 6 which is responsible for overload triggering.

Auxiliary measurements in certain fixed time slots are also conceivable for detection. Very hard short circuits lead to current paths which allow the delta, i.e. the difference between two measurements of the same time intervals, to become bigger than the typical signal characteristic would allow during normal operating performance.

The inventive technical solution of an embodiment of the protective switching devices makes it possible to cater to the different requirements of short circuit and overload triggering.

Figure 3:
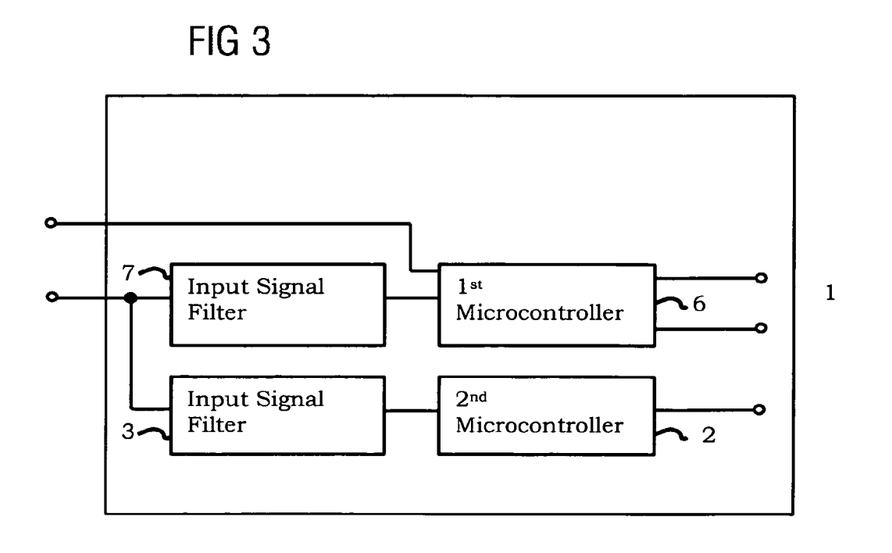
FIG. 3 shows the schematic diagram of a protective switching device with two microcontrollers that work independently.

Owing to the presence of inexpensive, fast and small microcontrollers a financial drawback does not have to result from using two smaller microcontrollers 2, 6 as opposed to one larger microcontroller. To the contrary, the microcontrollers can be more simply, and therefore less expensively, constructed as they only have to cover one scenario respectively, overload or short circuit.

The software algorithms of short circuit triggering can be configured so as to be correspondingly fast. An intervention can be made immediately in a corresponding interrupt routine in the event of a short circuit occurrence, without the second microcontroller 2 having to buffer excessive data and return addresses in advance. The software algorithms of the overload triggerings can continue to work simultaneously and store the corresponding data ($I^2t$). This would be helpful for example in the event of a false triggering, i.e. the comparator 10 detects a short circuit but the subsequent re-measurement by the two measuring devices 11, 13 is negative.

Ideally it is accordingly easily possible to design the input signal. filters 3, 7 of the input measured quantities, in particular the voltage as a depiction of the current, differently. Optimally fast short circuit detection requires input signal filters 3 whose low-pass character is not so pronounced in order to dampen rising steep edges as little as possible. For overload triggering, however, it is important to avoid sampling errors, i.e. the detection of falling and rising values. It is possible to filter fast transients and harmonic components more effectively owing to the less time-critical circumstances. Therefore input signal filters 7 with low-pass character or higher-order input signal filters are advantageous in the case of the first microcontroller 6 which is responsible for overload detection.

Different measuring ranges for measuring algorithms 11, 13, i.e. in particular for the analog-digital converter, result in the second microprocessor 2 owing to function sharing. A positive consequence of this is that the accuracy and resolution requirements of the measuring devices 11, 13 can be reduced accordingly.

By nesting the short circuit algorithm it is possible to cut off very hard short circuits, for example 100 times the rated current intensity $I_N$, particularly quickly to avoid potential damage to connected loads of the protective switching device 1. Accuracy can be dispensed with in this case. Less hard short circuits, for example $15 \times I_N$, in which there is slightly more time available, must then be re-measured with greater accuracy.

Nesting via the comparator interrupt, fast measurement and more accurate measurement allow fast short circuit detection with a simultaneously high level of immunity to interference.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protective switching device for monitoring electrical current flow to an electrical load, including a switching functionality, an excess current triggering functionality and a short circuit triggering functionality, the protective switching device comprising:
    a first microcontroller, including a first input signal filter, to monitor the excess current triggering functionality; and
    a second microcontroller, including a second input signal filter, to monitor the short circuit triggering functionality, the first and second input signal filters being designed differently, the first microcontroller operating independently of the second microcontroller,
    wherein the switching functionality is provided in one of the first and second microcontrollers.

2. The protective switching device as claimed in claim 1, wherein the first microcontroller comprises the switching functionality and the excess current triggering functionality.

3. The protective switching device as claimed in claim 1, wherein the second microcontroller comprises:
    a comparator and at least two measuring devices arranged one after the other downstream of the comparator;
    comparison units to measure a current intensity or a voltage and to compare the measured current intensity or voltage with reference current intensities or reference voltages; and
    a triggering signal unit connected downstream of the measuring devices.

4. The protective switching device as claimed in claim 3, wherein the first measuring device has a lower resolution than the second measuring device connected downstream.

5. The protective switching device as claimed in claim 3, wherein the first and the second measuring devices each comprise an analog-digital converter.

6. The protective switching device as claimed in claim 5, wherein the analog-digital converter of the first measuring device includes a 4 to 8 bit resolution and the analog-digital converter of the second measuring device includes a 9 or 10 bit resolution.

7. The protective switching device as claimed in claim 1, wherein the low-pass character of the first input signal filter of the first microcontroller is designed so as to be relatively higher than the low-pass character of the second input signal filter of the second microcontroller.

8. The protective switching device as claimed in claim 1, wherein the protective switching device is a multi-functional low-voltage switching device or a power switch with electronic excess current protection.

9. A method for monitoring the electrical current flow to an electrical load by way of a protective switching device, the method comprising:
    monitoring, via a first input signal filter of a first microcontroller, signal characteristic of the current flow or a voltage;
    generating, via the first microcontroller, at least one of an error signal and a trigger signal when an overload is detected;
    monitoring, via a second input signal filter of a second microcontroller, signal characteristics of the current flow or the voltage;
    generating, via the second microcontroller, a trigger signal when a short circuit is detected,
    wherein the first microcontroller operates independently of the second microcontroller, and
    wherein the first and second input signal filters are designed differently and wherein the current flow is interrupted following generation of a trigger signal.

10. The method as claimed in claim 9, wherein the second microcontroller uses an integrated comparator to monitor the signal characteristic of the current flow or the voltage characteristic, wherein a first measuring device, connected downstream of the comparator, re-measures the current intensity when an input current intensity or input voltage is exceeded, and wherein the first measuring device forwards a signal to the second microcontroller to generate a trigger signal when it is detected that the measured current intensity exceeds the first reference current intensity, or the first measuring device forwards a signal to a second measuring device connected downstream when it is detected that the measured current intensity does not exceed the first reference current intensity, so the second measuring device re-measures the current intensity again and compares it with a second reference current intensity, the second measuring device forwarding a signal to the second microcontroller to generate a trigger signal when it is detected that the measured current intensity exceeds the second reference current intensity, or the second measuring device does not forward a signal to the second microcontroller to generate a trigger signal when it is detected that the measured current intensity does not exceed the second reference current intensity.

11. The method as claimed in claim 9, wherein the protective switching device, configured for carrying out the method as claimed in claim 9, comprises:
    a first microcontroller, including a first input signal filter, to monitor the excess current triggering functionality; and
    a second microcontroller, including a second input signal filter, to monitor the short circuit triggering functionality, the first and second input signal filters being designed differently, wherein the switching functionality is provided in one of the first and second microcontrollers.

12. The method as claimed in claim 10, wherein a first measuring algorithm of the first measuring device measures at a relatively lower resolution than a second downstream second measuring algorithm of the second measuring device.

13. The method as claimed in claim 12, wherein the first and second measuring algorithms each use an analog-digital conversion.

14. The method as claimed in claim 12, wherein the analog-digital conversion of the first measuring algorithm uses a 4 to 8 bit resolution and the analog-digital conversion of the second measuring algorithm uses a 9 or 10 bit resolution.

15. The method as claimed in claim 12, wherein at least one of the measuring algorithms uses an increase of the current to reliably detect a short circuit occurrence.

16. The protective switching device as claimed in claim 2, wherein the second microcontroller comprises:
   a comparator and at least two measuring devices arranged one after the other downstream of the comparator;
   comparison units to measure a current intensity or a voltage and to compare the measured current intensity or voltage with reference current intensities or reference voltages; and
   a triggering signal unit connected downstream of the measuring devices.

17. The protective switching device as claimed in claim 16, wherein the first measuring device has a lower resolution than the second measuring device connected downstream.

18. The protective switching device as claimed in claim 4, wherein the first and the second measuring devices each comprise an analog-digital converter.

19. The method as claimed in claim 10, wherein the protective switching device, configured for carrying out the method as claimed in claim 10, comprises:
   a first microcontroller, including a first input signal filter, to monitor the excess current triggering functionality; and
   a second microcontroller, including a second input signal filter, to monitor the short circuit triggering functionality, the first and second input signal filters being designed differently, wherein the switching functionality is provided in one of the first and second microcontrollers.

20. The method as claimed in claim 11, wherein a first measuring algorithm of the first measuring device measures at a relatively lower resolution than a second downstream second measuring algorithm of the second measuring device.

* * * * *